United States Patent [19]
Nosaka

[11] 3,936,165
[45] Feb. 3, 1976

[54] EYEGLASSES

[76] Inventor: Ihachi Nosaka, No. 17-16, Kita Yotsui-cho, Fukui, Fukui, Japan

[22] Filed: July 29, 1974

[21] Appl. No.: 492,453

[30] Foreign Application Priority Data
Nov. 15, 1973 Japan.............................. 48-128661

[52] U.S. Cl. ............... 351/128; 16/128 A; 351/153
[51] Int. Cl.² .......................................... G02C 5/04
[58] Field of Search ....... 351/124, 153, 19, 65, 128; 16/128 A

[56] References Cited
UNITED STATES PATENTS
2,537,248   1/1951   Vigano......................... 16/128 A X Primary Examiner—Paul A. Sacher
Attorney, Agent, or Firm—George B. Oujevolk

[57] ABSTRACT

A pair of eyeglasses is provided with a mechanism on the nose bridge making it possible to turn one of the glasses around. A side piece attached thereto turns over together with said one glass, with the result that both of the sidepieces will be disposed over the glasses on both sides so as to protect the glasses from impact and the like.

1 Claim, 4 Drawing Figures

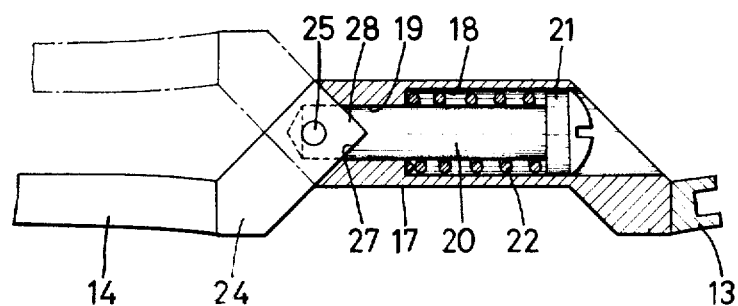
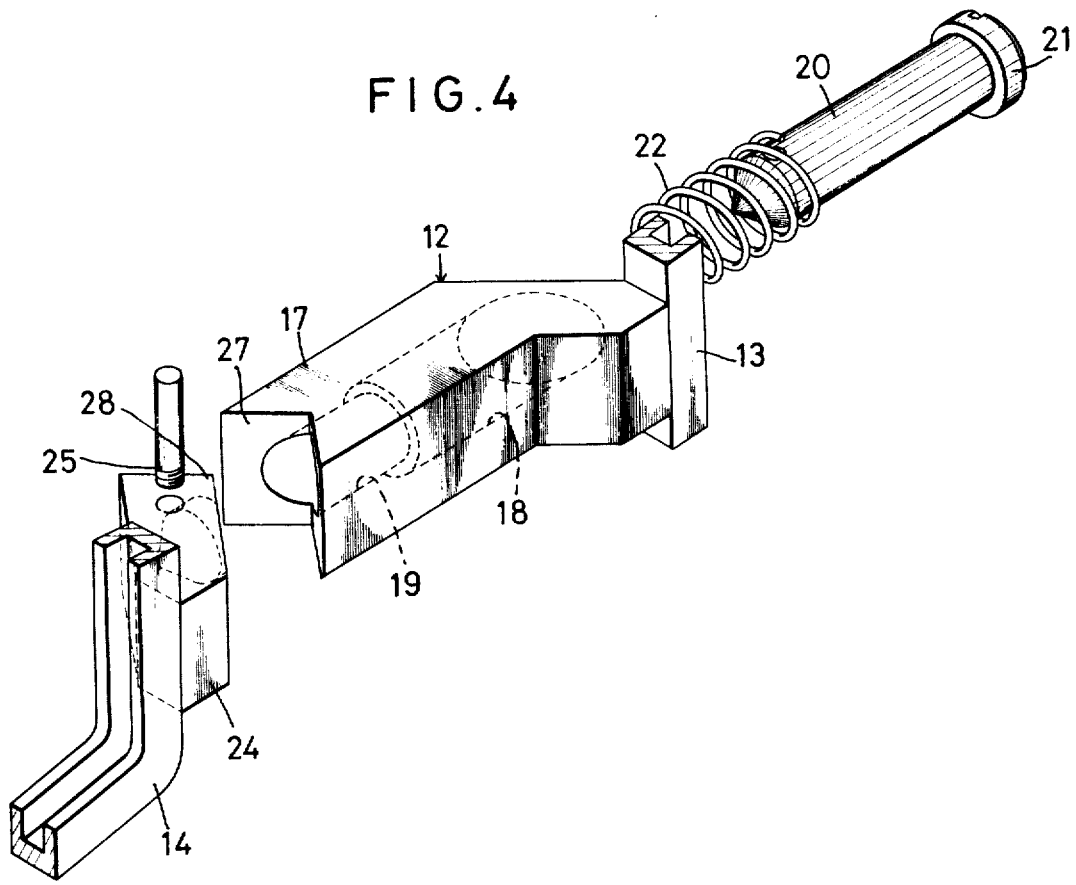

EYEGLASSES

BACKGROUND OF THE INVENTION

The present invention relates to a pair of eyeglasses wherein the bridge thereof has mechanical features which enables one of the glasses to turn around. A sidepiece which is attached thereto also turns together with said one glass, with the result that both of the sidepieces will be disposed over both of the glasses at both sides thereof.

BRIEF DESCRIPTION OF THE PRIOR ART

Conventional eyeglasses require a case for the glasses when they are not used so as not to damage the glasses.

OBJECT OF THE INVENTION

A main object of this invention is to provide eyeglasses having a mechanism for turning one of the glasses around so that the sidepiece attached thereto also turns together with said one glass, resulting in the protection of both of the glasses at both sides by the attached sidepiece which are disposed over the glasses on both sides so as to dispense with a case.

A second object of this invention is to provide eyeglasses as mentioned above wherein the mechanism does not cause any instability in the framework thereof.

These objects can be accomplished by the improvement, combination and operation of every part constituting this invention, the preferred embodiment of which will be illustrated in relation with the annexed drawings in which:

BRIEF DESCRIPTION OF THE DRAWINGS

FIG. 3 is a sectional plan view of the bridge of the glasses on a magnified scale.

FIG. 4 is a perspective exploded view of the glasses on a magnified scale.

Figure 1:
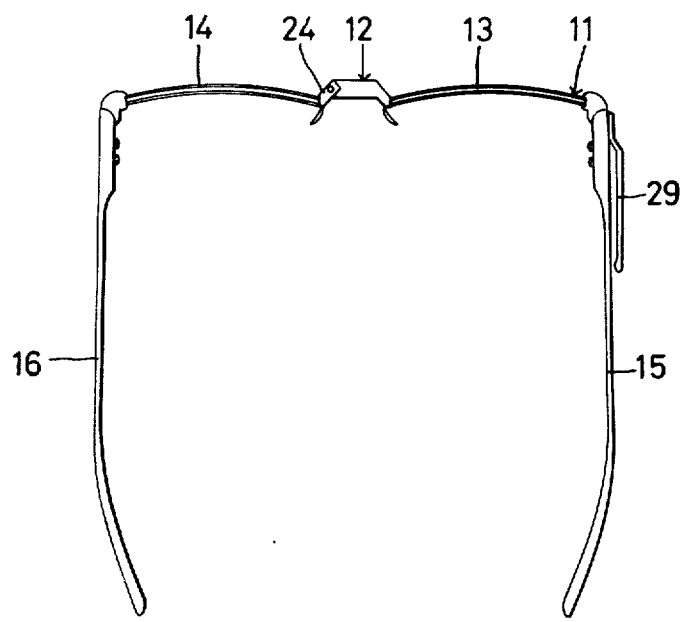
FIG. 1 is a plan view of a pair of eyeglasses of this invention in the state of ready for wearing.
Figure 2:
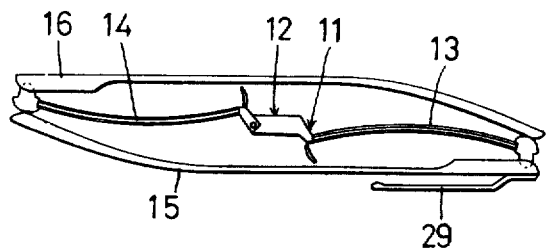
FIG. 2 is a plan view of the glasses in a folded state.

In the above FIG. 1 to 4, numeral 12 designates the bridge, 13 and 14 designating the glass frames and 15 and 16 sidepieces.

(Right and left designates directions in accordance with FIG. 3 & 4.)

The bridge 12 comprises a cylindrical main body 17, the inside space 19 of which forms a diametrically enlarged chamber 18 between an intermediate pont and the right end wall thereof, a shaft 20 provided with a flange 21 at the right end thereof extends slidably within space 19 with flange 21 usually resting at the right end of space 19. A spring 22 is wound over shaft 20 within said diametrically enlarged portion 18, said spring 22 being held at right end thereof by said flange 21 and at left end thereof by an annular wall partitioning the diametrically enlarged portion 18, said spring 22 being held at right end thereof by said flange 21 and at left end thereof by an annular wall partitioning the diametrically enlarged portion 18 off the space 19. Spring 22 is held therein in a compressed state so that it may impose a constant rightward bias on flange 21 and accordingly on shaft 20.

The bridge main body 17 is fixed at the projecting right end portion thereof to the rim 13 by the usual connecting means but at the left end forms a recess 27 so as to fit therein a projection 28 of the left side rim 14 at a connecting portion 24. The afore-mentioned shaft 20 extends leftward against the rightward bias of spring 22 engaging connecting portion 24 intermediately at the inside thereof by means of a pin 25, said pin vertically penetrating through connecting portion 24 and shaft 20 at the left end portion thereof thereby making it possible for connecting portion 24 to firmly engage recess 27 under the rightward pulling effect of spring 22.

Connecting portion 24 is detachable from said recess 27 by pulling against spring 22 so as to turn the left rim 14 around and accordingly covering the glasses on both faces thereof with sidepieces 15 and 16. Needless to say, the left rim 14 may be turned back to normal by the same steps.

The sidepieces 15 and 16 may be fitted to the rims 13 and 14 respectively by means of hinges as in the case of regular eye glasses.

For additional convenience, a clip 29 is provided on the sidepiece 15 so as to hold the pair of glasses in a breast pocket.

What is claimed is:

1. In a pair of eyeglasses, a pair of glass rims, and between the glass rims, in combination:
   a. a cylindrical nose bridge having a longitudinal recess at one end, said recess having an inner space and a diametrically enlarged chamber at the inside of said recess with an inner wall;
   b. a shaft with a flange, said shaft extending therethrough from said one end with a connecting aperture at said shaft other end;
   c. a spring wound around said shaft sandwiched in a compressed state in said chamber between said flange at the one end of said shaft and said inner wall, partitioning said chamber from said inner space so that said spring may bias said shaft in the direction of the flange; and,
   d. a projecting connecting portion on one of said glass rims and a penetrating holding pin passing through said shaft connecting aperture, said pin penetrating through said connecting portion and said shaft at said other end, connecting said one glass rim to said other end, whereby said one rim at said projecting connecting portion detachably engages said bridge under the pulling effect of said spring, said rim being able to turn around or turned back by pulling out said rim from said bridge, the other rim being coupled to the bridge said one end.

* * * * *